(12) United States Patent
Kato et al.

(10) Patent No.: US 7,000,586 B2
(45) Date of Patent: Feb. 21, 2006

(54) CONTROL DEVICE FOR COMPRESSION IGNITION OPERATION OF INTERNAL COMBUSTION ENGINE

(75) Inventors: Akira Kato, Saitama (JP); Toru Kitamura, Saitama (JP); Tomio Kimura, Saitama (JP); Shohei Okazaki, Saitama (JP); Toshihiro Yamaki, Saitama (JP); Katsura Okubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/851,648

(22) Filed: May 24, 2004

(65) Prior Publication Data
US 2004/0261764 A1 Dec. 30, 2004

(30) Foreign Application Priority Data
May 23, 2003 (JP) ............................ P.2003-146027

(51) Int. Cl.
*F02B 5/00* (2006.01)
*F02M 25/07* (2006.01)
*F02D 41/04* (2006.01)

(52) U.S. Cl. .................. 123/305; 123/486; 123/568.14

(58) Field of Classification Search ................ 123/295, 123/305, 478, 480, 486, 500, 501, 502, 564, 123/676, 395, 568.14; 60/600, 601, 611; 701/104, 105, 108
See application file for complete search history.

(56) References Cited

U.S. PATENT DOCUMENTS

| | | | | |
|---|---|---|---|---|
| 4,643,154 A | * | 2/1987 | Matsuno et al. | 123/486 |
| 6,101,998 A | * | 8/2000 | Tamura et al. | 123/295 |
| 6,295,816 B1 | * | 10/2001 | Gallagher et al. | 60/611 |
| 6,499,456 B1 | * | 12/2002 | Nogi et al. | 123/305 |
| 6,769,392 B1 | * | 8/2004 | Lawrence et al. | 123/305 |
| 6,772,585 B1 | * | 8/2004 | Iihoshi et al. | 123/305 |
| 6,814,060 B1 | * | 11/2004 | Solomons et al. | 123/501 |

FOREIGN PATENT DOCUMENTS

JP 10-266878 10/1998

\* cited by examiner

*Primary Examiner*—Willis R. Wolfe, Jr.
(74) *Attorney, Agent, or Firm*—Arent Fox PLLC

(57) ABSTRACT

A controller for an internal combustion engine capable of performing a compression ignition operation. The internal combustion engine includes a combustion chamber, and a fuel injector for injecting fuel directly in the combustion chamber. The controller includes: an air pressure detecting unit configured to detect at least one of an air pressure and an exhaust air pressure; and a fuel injection control unit configured to actuate the fuel injector to control a fuel injection timing according to a detected result by the air pressure detecting unit. The fuel injection control unit puts the fuel injection timing forward as the detected result by the air pressure detecting unit is lowered.

2 Claims, 3 Drawing Sheets

CONTROL DEVICE FOR COMPRESSION IGNITION OPERATION OF INTERNAL COMBUSTION ENGINE

BACKGROUND OF THE INVENTION

1. Field of the Invention

The present invention relates to a control device for compression ignition operation of an internal combustion engine which is capable of performing a compression ignition operation.

2. Background Art

When the compression ignition operation in which air-fuel mixture supplied to an internal combustion engine is burned by compression ignition (compression self-ignition) is employed, since compression ratio is high, the good mileage can be obtained and relatively stable combustion is achieved even with a lean air-fuel ratio, and in addition, since the combustion temperature is relatively low, the amount of generation of NOx can be reduced.

In order to induce compression ignition, it is necessary to increase the gas temperature in a combustion chamber to a predetermined temperature or higher, and hence an internal EGR utilizing exhaust heat is generally employed.

The internal EGR is implemented by so-called minus overlap control in which an exhaust valve is closed at an early timing during an exhaust stroke, and an intake valve is opened at a delayed timing during an intake stroke.

In other words, part of combustion gas is entrapped in the combustion chamber by closing the exhaust valve at an early timing and opening the intake valve at a delayed timing near the top dead center of the intake stroke, and is mixed with intake air taken during the next cycle as remaining gas (internal EGR gas) to increase the gas temperature and hence induce the compression self-ignition.

Control of self ignition to effect at an optimal timing is generally performed by adiabatic compression by adjusting the temperature of fuel before compression by adjusting the amount of remaining gas through minus overlap control of valve timing (For example, JP-A-10-266878).

SUMMARY OF THE INVENTION

Since flowing out of EGR gas from the combustion chamber is caused by difference between the pressure in the combustion chamber and the ambient pressure (or exhaust air pressure), the amount of EGR gas remaining in the combustion chamber is influenced by the ambient pressure, and hence the timing of self ignition is also under the influence of the ambient pressure.

However, the influence of the ambient pressure has not been taken into consideration in the related art.

In other words, since valve timing control of minus overlap is set on a flatland in an average atmospheric pressure for the internal combustion engine, when it is operated on a land at low pressure such as a highland, the amount of the remaining gas in the internal combustion engine (internal EGR gas) underruns the preset value, and hence the timing of self ignition tends to be delayed due to reduction of heat quantity, which results in lowering of efficiency of the engine.

There is a case in which change in the air pressure due to meteorological conditions results in change of the amount of internal EGR gas, and hence the timing of self ignition cannot be maintained at an optimal value.

In view of such circumstances, it is an object of the present invention to provide a control device for compression ignition operation of an internal combustion engine which can constantly maintain the efficiency of the engine at the maximum value by adjusting the timing of compression ignition to an optimal timing according to the change of the air pressure.

To achieve the object, the invention provides a controller for an internal combustion engine capable of performing a compression ignition operation, wherein the internal combustion engine includes a combustion chamber, and a fuel injector for injecting fuel directly in the combustion chamber. The controller includes: an air pressure detecting unit configured to detect at least one of an air pressure and an exhaust air pressure; and a fuel injection control unit configured to actuate the fuel injector to control a fuel injection timing according to a detected result by the air pressure detecting unit. The fuel injection control unit puts the fuel injection timing forward as the detected result by the air pressure detecting unit is lowered.

The invention provides an internal combustion engine for performing a compression ignition operation. The internal combustion engine includes: a combustion chamber; a fuel injector that injects fuel directly in the combustion chamber; an air pressure detector that detects at least one of an air pressure and an exhaust air pressure; and a fuel injection controller connected to the air pressure detector and configured to actuate the fuel injector to control a fuel injection timing according to a detected result by the air pressure detector. The fuel injection controller puts the fuel injection timing forward as the detected result by the air pressure detecting unit is lowered.

Since the fuel injection controller advances the fuel injection timing for activating the fuel injector as the air pressure is lowered, the timing of self ignition which tends to be delayed due to decrease in the air pressure can be returned to an optimal timing by advancing the fuel injection timing and hence the efficiency of the engine can be maintained constantly at the maximum value.

BRIEF DESCRIPTION OF THE DRAWINGS

The present invention may be more readily described with reference to the accompanying drawings.

DETAILED DESCRIPTION OF THE PREFERRED EMBODIMENTS

Referring now to FIG. 1 to FIG. 4, an embodiment of the present invention will be described.

An internal combustion engine 1 according to the present embodiment is a four-stroke cycle, multi-cylinder internal combustion engine (may be a single-cylinder), which is capable both of different operations; the operation of spark ignition (SI) combustion system (spark ignition operation) and the operation of compression ignition (HCCI: Homogeneous Charge Compression Ignition) combustion system (compression ignition operation).

Figure 1:
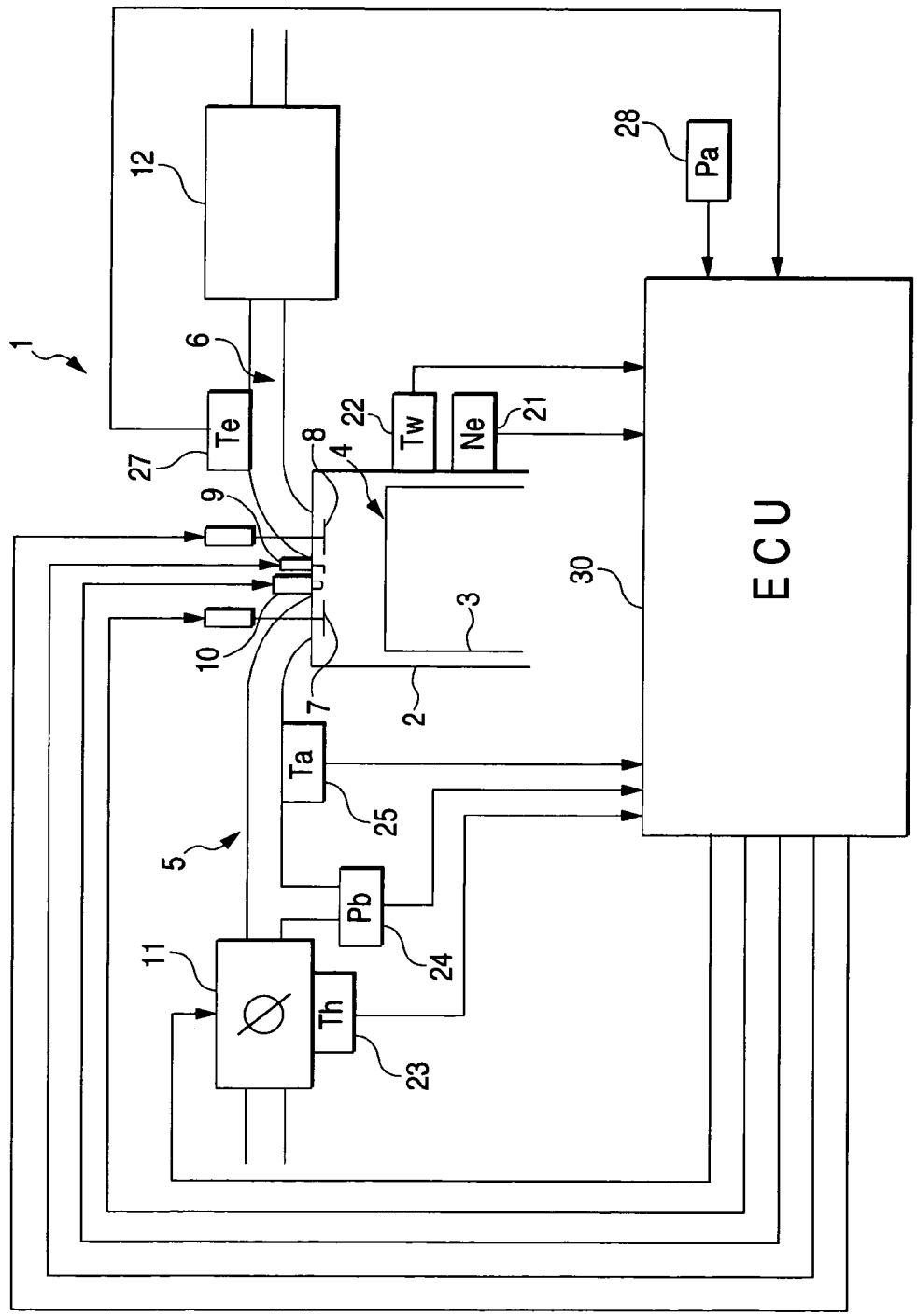
FIG. 1 is a schematic block diagram of an internal combustion engine according to an embodiment of the present invention.

FIG. 1 is a schematic block diagram of the internal combustion engine 1, in which a piston 3 reciprocates in a cylinder 2 and a combustion chamber 4 is formed between a cylinder head for closing the cylinder 2 and the piston 3.

An intake channel 5 and an exhaust channel 6 are extending from the combustion chamber 4 via ports, an intake valve 7 is provided at an opening of an intake port facing the combustion chamber 4, and an exhaust valve 8 is provided at an opening of an exhaust port facing the combustion chamber 4. The intake valve 7 for controlling intake air to the combustion chamber 4 and the exhaust valve 8 for controlling exhaust air from the combustion chamber 4 are both electromagnetic valves.

In addition, the combustion chamber 4 is provided with an ignition plug 9, and a fuel injection valve 10 for injecting fuel directly into the combustion chamber 4.

The ignition plug 9 is driven during spark ignition operation and ignites air-fuel mixture in the combustion chamber 4 by electric discharge.

The fuel injection valve 10 is connected to a fuel supply pump, not shown, and injects fuel into the combustion chamber 4 at controlled timings for controlled periods.

A throttle valve 11 for controlling the amount of intake air flow is interposed in the intake channel 5, and the throttle valve 11 is driven by an actuator (not shown). The opening of the throttle valve is controlled according to the operating state.

An exhaust air purifying device 12 is interposed in the exhaust channel 6, and a NOx adsorption catalyst (LNC) is used in the exhaust air purifying device 12.

Various sensors for detecting the operating state of the internal combustion engine 1 which is configured substantially as described above are provided in various locations.

A revolution number sensor 21 for detecting a number of revolution (number of revolution of the engine) Ne of a crankshaft of the internal combustion engine 1 and a water temperature sensor 22 for detecting a temperature (engine water temperature) Tw of coolant for the internal combustion engine 1 are provided on the main body of the internal combustion engine 1.

The intake channel 5 is provided on a throttle valve 11 with a throttle sensor 23 for detecting a throttle valve opening Th, an intake air pressure sensor 24 for detecting a negative pressure of the intake air Pb in the intake channel 5 on the downstream side of the throttle valve 11, and an intake air temperature sensor 25 for detecting an intake air temperature Ta in the intake channel 5.

The exhaust channel 6 is provided with an exhaust air temperature sensor 27 for detecting an exhaust air temperature Te on the upstream side of the exhaust air purifying device 12.

In addition, an ambient pressure sensor 28 for detecting an ambient pressure Pa is provided.

Detection signals from various sensors such as the revolution number sensor 21, the water temperature sensor 22, the throttle sensor 23, the intake air pressure sensor 24, the intake air temperature sensor 25, and the ambient pressure sensor 28 are supplied to an electronic control unit ECU 30, processed by a computer, and used for controlling the operation of the intake valve 7, the exhaust valve 8, the ignition plug 9, the fuel injection valve 10, and the throttle valve 11.

The internal combustion engine 1 is operated by spark ignition operation which allows the ignition plug 9 to discharge until warming-up after start-up of the engine is completed to a certain extent, and then by compression ignition operation in a wide stable operating range.

By achieving the compression ignition combustion in the wide operating range, fuel consumption may be reduced, and the amount of discharge of nitrogen oxide (NOx) may be controlled.

The compression ignition operation of the internal combustion engine 1 is controlled so that compression ignition is performed at an optimal timing by adjusting the amount of internal EGR gas by minus overlap control.

In other words, the amount of minus overlap is obtained based on the intake air temperature Ta and the exhaust air temperature Te, and the valve timings of the intake valve 7 and the exhaust valve 8 are controlled according to the amount of minus overlap.

However, when the ambient pressure is lowered, the percentage of the exhaust amount of the combustion gas is increased under minus overlap control, and hence the amount of remaining gas (internal EGR gas) underruns the predetermined amount. Therefore, the heat amount is reduced, and hence the timing of self ignition tends to be delayed.

On the other hand, the fuel injection timing by the fuel injection valve 10 is controlled to be capable of igniting at an optimal timing during the latter half of the compression stroke with fuel activation period taken into consideration.

The fuel injection may be performed during exhaust-intake stroke and during the compression stroke. However, in particular, when injecting fuel during the compression stroke and the self ignition timing tends to be delayed due to decrease in the ambient pressure as described above, the timing of self ignition may be returned to the optimal timing by advancing the timing of fuel injection.

A procedure of fuel injection timing control by the ECU 30 will be shown in a flowchart in FIG. 2 and will be described below.

The correlation between a fuel injection timing to at the average air pressure 760 mmHg on a flatland and an advance angle $\Delta t$ of the fuel injection timing based on the fuel injection timing to with respect to the change of an ambient pressure Pa, which is obtained in advance, is stored in the ECU 30.

Figure 3:
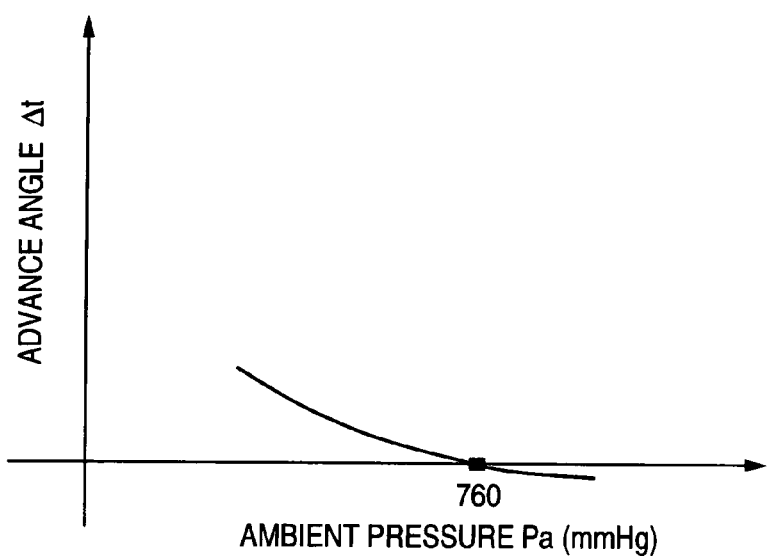
FIG. 3 is a drawing showing the correlation between an ambient pressure Pa and an advance angle $\Delta t$ of the fuel injection timing.

FIG. 3 shows the above-described relation shown on a rectangular coordinate.

The lateral axis represents the ambient pressure Pa, and the vertical axis represents the advance angle $\Delta t$ of the fuel injection timing based on the fuel injection timing to. It shows such correlation that the advance angle $\Delta t$ increases with decrease in the ambient pressure Pa.

Figure 2:
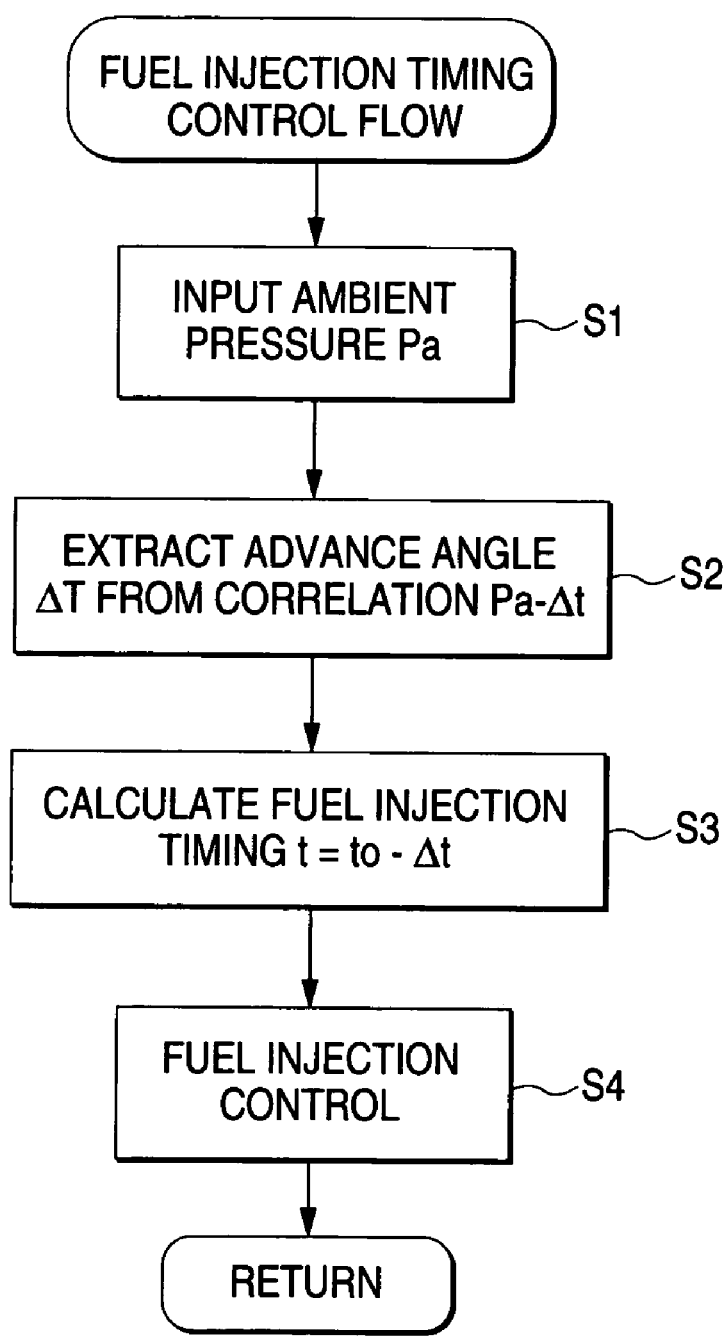
FIG. 2 is a flowchart showing a procedure of fuel injection timing control.

In the flowchart shown in FIG. 2, when the ambient pressure Pa detected by the ambient pressure sensor 28 is supplied (Step 1), the advance angle $\Delta t$ of the fuel injection timing corresponding to this ambient pressure Pa is extracted by checking the correlation shown in FIG. 3 (Step 2).

Subsequently, the advance angle $\Delta t$ extracted from the fuel injection timing to as a reference is subtracted to obtain a fuel injection timing t (=to−$\Delta t$) (Step 3), and fuel injection is controlled to be performed at the obtained fuel injection timing t (Step 4).

Figure 4:
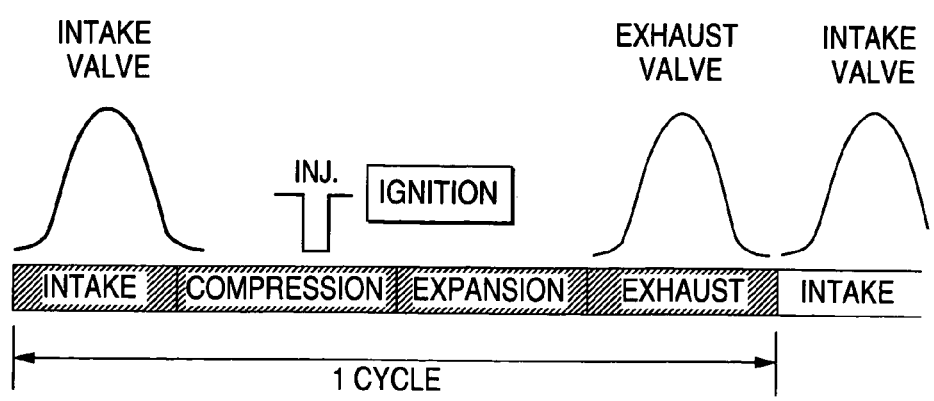
FIG. 4 is a drawing showing an example of the valve timing and the fuel injection timing in each stroke of a four-stroke cycle.

FIG. 4 shows an example of valve timing and fuel injection timing at each stroke of a four-stroke cycle.

The valve timing is performed under minus overlap control, and the internal EGR amount is controlled to perform compression ignition of a four-stroke cycle by advancing the timing of closing the exhaust valve 8 in the exhaust stroke and delaying the timing of opening the intake valve 7 in the intake stroke so that part of burned gas is entrapped in the combustion chamber 4.

By adjusting the amount of EGR gas by minus overlap control, the ignition temperature is secured, so that accidental fire is prevented, good drivability is maintained, and discharge of unburned HC is inhibited.

The fuel injection timing in the compression stroke is moved to the fuel injection timing t, which advances with decrease in the ambient pressure based on the fuel injection timing to of the normal air pressure (760 mmHg) on a flatland.

The timing of self ignition which tends to be delayed due to decrease in the air pressure can be adjusted by advancing the fuel injection timing so that the compression ignition is performed at an optimal timing in the latter half of the compression stroke, and hence the efficiency of the engine can be maintained constantly at the maximum value.

It is especially effective for the internal combustion engine to be mounted to a vehicle which moves freely on the land of varying the air pressure from the lowland to the highland as a motor vehicle.

In the above-described embodiment, while the advance angle Δt of the fuel injection timing is extracted based on the ambient pressure Pa detected by the ambient pressure sensor 28, the exhaust air pressure may also be applied instead of the ambient pressure Pa.

In this case, it is necessary to obtain the correlation between the exhaust air pressure and the advance angle Δt of the fuel injection timing in advance and store it.

What is claimed is:

1. A controller for an internal combustion engine capable of performing a compression ignition operation of the internal combustion engine that is controlled so that compression ignition is performed at an optimal timing by adjusting an amount of internal EGR gas, wherein the internal combustion engine includes a combustion chamber, and a fuel injector for injecting fuel directly in the combustion chamber; the controller comprising:
    an air pressure detecting unit configured to detect at least one of an ambient air pressure and an exhaust air pressure; and
    a fuel injection control unit configured to actuate the fuel injector to control a fuel injection timing according to a detected result by the air pressure detecting unit;
    wherein the fuel injection control unit advances the fuel injection timing as the detected result by the air pressure detecting unit is lowered.

2. An internal combustion engine for performing a compression ignition operation of the internal combustion engine that is controlled so that compression ignition is performed at an optimal timing by adjusting an amount of internal EGR gas, comprising:
    a combustion chamber;
    a fuel injector that injects fuel directly in the combustion chamber;
    an air pressure detector that detects at least one of an ambient air pressure and an exhaust air pressure; and
    a fuel injection controller connected to the air pressure detector and configured to actuate the fuel injector to control a fuel injection timing according to a detected result by the air pressure detector;
    wherein the fuel injection controller advances the fuel injection timing as the detected result by the air pressure detecting unit is lowered.

* * * * *